(12) United States Patent
Injeyan et al.

(10) Patent No.: US 6,178,040 B1
(45) Date of Patent: Jan. 23, 2001

(54) LASER WITH TWO ORTHOGONAL ZIG-ZAG SLAB GAIN MEDIA FOR OPTICAL PHASE DISTORTION COMPENSATION

(75) Inventors: Hagop Injeyan, Glendale; Randall J. St. Pierre, Santa Monica; Stephen P. Palese, Torrance, all of CA (US)

(73) Assignee: TRW Inc., Redondo Beach, CA (US)

( * ) Notice: Under 35 U.S.C. 154(b), the term of this patent shall be extended for 0 days.

(21) Appl. No.: 09/104,477

(22) Filed: Jun. 25, 1998

(51) Int. Cl.[7] .................................. H01S 3/00; H01S 3/16
(52) U.S. Cl. ................................. 359/346; 372/41
(58) Field of Search ..................... 359/333, 346; 372/41, 92

(56) References Cited

U.S. PATENT DOCUMENTS

| | | |
|---|---|---|
| 3,628,180 * | 12/1971 | Segre .................................. 331/94.5 |
| 3,679,999 | 7/1972 | Chernoch . |
| 4,127,827 | 11/1978 | Barry . |
| 4,730,324 | 3/1988 | Azad . |
| 4,852,109 | 7/1989 | Kuchar . |
| 4,949,346 | 8/1990 | Kuper . |
| 4,984,246 | 1/1991 | Cabaret et al. . |
| 5,001,718 | 3/1991 | Burrows et al. . |
| 5,271,031 | 12/1993 | Baer . |
| 5,305,345 | 4/1994 | Albrecht et al. . |
| 5,307,430 | 4/1994 | Beach et al. . |
| 5,317,585 | 5/1994 | Gregor . |
| 5,351,251 | 9/1994 | Hodgson . |
| 5,386,431 * | 1/1995 | Tulip .................................. 372/68 |
| 5,394,420 | 2/1995 | Senn et al. . |
| 5,441,803 | 8/1995 | Meissner . |
| 5,455,838 | 10/1995 | Heritier et al. . |
| 5,467,214 | 11/1995 | Heflinger et al. . |
| 5,473,622 | 12/1995 | Grubb . |
| 5,479,430 * | 12/1995 | Shine, Jr. et al. .................. 372/66 |
| 5,549,606 | 8/1996 | Senn et al. . |
| 5,555,254 | 9/1996 | Injeyan et al. . |
| 5,646,773 | 7/1997 | Injeyan et al. . |
| 5,651,020 | 7/1997 | Nighan . |
| 5,651,021 | 7/1997 | Richard et al. . |
| 5,825,791 | 10/1998 | Injeyan et al. . |

FOREIGN PATENT DOCUMENTS

| | | |
|---|---|---|
| 0652616 | 5/1995 | (EP) . |
| 5343765 | 12/1993 | (JP) . |

* cited by examiner

Primary Examiner—Mark Hellner
(74) Attorney, Agent, or Firm—Michael S. Yatsko

(57) ABSTRACT

An optical amplifier for use with a solid state laser which includes a pair of elongated slabs of a solid state lasing material, such as a rare earth doped yttrium-aluminum-garnet (YAG) crystal. Two embodiments of the invention are disclosed. In both embodiments of the invention, each of the elongated slabs is formed with a square or generally rectangular cross-section. The slabs are configured such that the longitudinal axes of the slabs are generally co-axial aligned and the slabs are orientated such that the major axis of the slabs are generally orthogonal. By configuring the two slabs to be orthogonal with respect to one another, the integrated thermal lens becomes azimuthally symmetric and can be compensated by a simple external lens. In addition, the negative lensing affect along the major axis of one slab is used to compensate for the positive lensing affect along the minor axis of the other slab and vice versa, thus minimizing the affects of the astigmatism. In an alternate embodiment of the invention, a dove prism is used to rotate the beam instead of rotation of the slabs.

31 Claims, 3 Drawing Sheets

LASER WITH TWO ORTHOGONAL ZIG-ZAG SLAB GAIN MEDIA FOR OPTICAL PHASE DISTORTION COMPENSATION

CROSS REFERENCE TO RELATED APPLICATIONS

This application is related to commonly owned co-pending patent application, entitled "End Pumped Zig-Zag Slab Laser Gain Medium" by H. Injeyan, et al., Ser. No. 09/580,726, filed on May 30, 2000, attorney docket This invention was made with Government support under Contract No. N00014-95-C-2253 awarded by the Naval Research Laboratory. The Government has certain rights in this invention.

BACKGROUND OF THE INVENTION

1. Field of the Invention

The present invention relates to an optical amplifier for use with a high-power, solid state laser, and more particularly to an optical amplifier which includes two elongated slabs of a solid state lasing material, for example, a yttrium-aluminum-garnet (YAG) host crystal that is doped with a rare earth metal ion, such as Erbium, Holmium, Neodymium, and Thulium or other rare earth metal ion, wherein the elongated slabs are configured to compensate for astigmatism which results in optical phase distortion of the laser beam wavefront due to thermal gradients in the traverse direction of the slabs.

2. Description of the Prior Art

Solid state lasers are known to include an optical amplifier, which includes a generally rectangular elongated slab of lasing material, such as a rare earth doped yttrium-aluminum-garnet (YAG) crystal, defining four lateral surfaces and opposing end faces. The refractive index of the slab is generally high while the index of refraction of any cooling medium disposed adjacent the lateral surfaces of the slab is selected to be relatively low. This difference in the indices of refraction at the slab to cooling medium interface causes a light beam entering an end face of the slab to be totally internally reflected within the slab. During such a condition, light entering one end face of the slab is reflected in the slab in a zig-zag pattern. As such, such optical amplifiers have become known as zig-zag amplifiers. Examples of such zig-zag amplifiers are disclosed in U.S. Pat. Nos. 3,679,999; 4,730,324; 4,852,109; 5,305,345; 5,646,773; 5,555,254; and 5,307,430.

The slab of lasing material is pumped by an external light source. The light source is used to pump the atoms in the lasing material to a relatively high energy metastable state. Various light sources are known for this application. For example, diode arrays are known to be used in such application. Examples of solid state lasers which utilize diode arrays for pumping are disclosed in U.S. Pat. Nos. 4,852,109; 4,949,346; 4,984,246; 5,271,031; 5,305,345; 5,317,585; and 5,351,251.

The pumping of atoms within the slab produces considerable heat therewithin. Since the slab is cooled on its surface, thermal gradients in a transverse or vertical direction (i.e. along a minor axis) occur. (As used herein the axis in the zig-zag or horizontal direction relative to a slab having a cross section which is generally square or rectangular is referred to as a major axis. The minor axis is generally perpendicular to the horizontal axis). These thermal gradients result from the temperature difference between the hot inner portions of the slab with respect to the cooled lateral faces. The thermal gradients are not a problem along a major axis of the slab since the zig-zag beam path within the slab causes the beam to average the thermal gradients in that direction. However, the thermal gradients are not averaged along the minor axis resulting in an astigmatism. As discussed in U.S. Pat. No. 4,730,324, the astigmatism results from the thermal gradients which are known to cause a deformation of the end face and lateral faces as well as variations in the refractive index in the slab resulting in a positive lensing affect along the minor axis and a slight negative lensing affect along the major axis causing optical phase distortion of the wavefront of the output laser beam.

Various methods are known for compensating for thermal gradients along the minor axis of the slab, for example, as disclosed in U.S. Pat. Nos. 4,852,109 and 5,646,773. In both of these patents, cooling channels are disposed along the lateral faces of the slab. The volumetric flow rate and the temperature of the fluid within the cooling channel may be varied in order to enable the temperature of lateral faces to be adjusted.

Although the systems disclosed in the '109 and '773 patents are able to provide compensation for the affects of the thermal gradients in the slab, such solutions for compensating for the positive lensing affect are relatively complex. As such, there is a need to develop a system with reduced complexity for reducing the astigmatism along the minor axis of the slab due to temperature gradients.

SUMMARY OF THE INVENTION

Briefly, the present invention relates to an optical amplifier for use with a solid state laser which includes a pair of elongated slabs of a solid state lasing material, such as a rare earth doped yttrium-aluminum-garnet (YAG) crystal. Two embodiments of the invention are disclosed. In both embodiments of the invention, each of the elongated slabs is formed with a generally square or rectangular cross-section defining a major axis and a minor axis. The slabs are configured such that the longitudinal axes of the slabs are generally coaxially aligned and the slabs are orientated such that the major axis of the slabs are generally orthogonal. By configuring the two slabs to be orthogonal with respect to one another, the integrated thermal lens becomes azimuthally symmetric and can be compensated by a simple external lens. In addition, the negative lensing affect along the major axis of one slab is used to partially compensate for the positive lensing affect along the minor axis of the other slab and vice versa, thus minimizing the affects of the astigmatism. In an alternate embodiment of the invention, a dove prism is used to rotate the beam instead of rotating of the slabs.

DESCRIPTION OF THE DRAWINGS

The principles of the present invention are more readily understood with reference to the following specification and attached drawings wherein.

DETAILED DESCRIPTION

Figure 1:
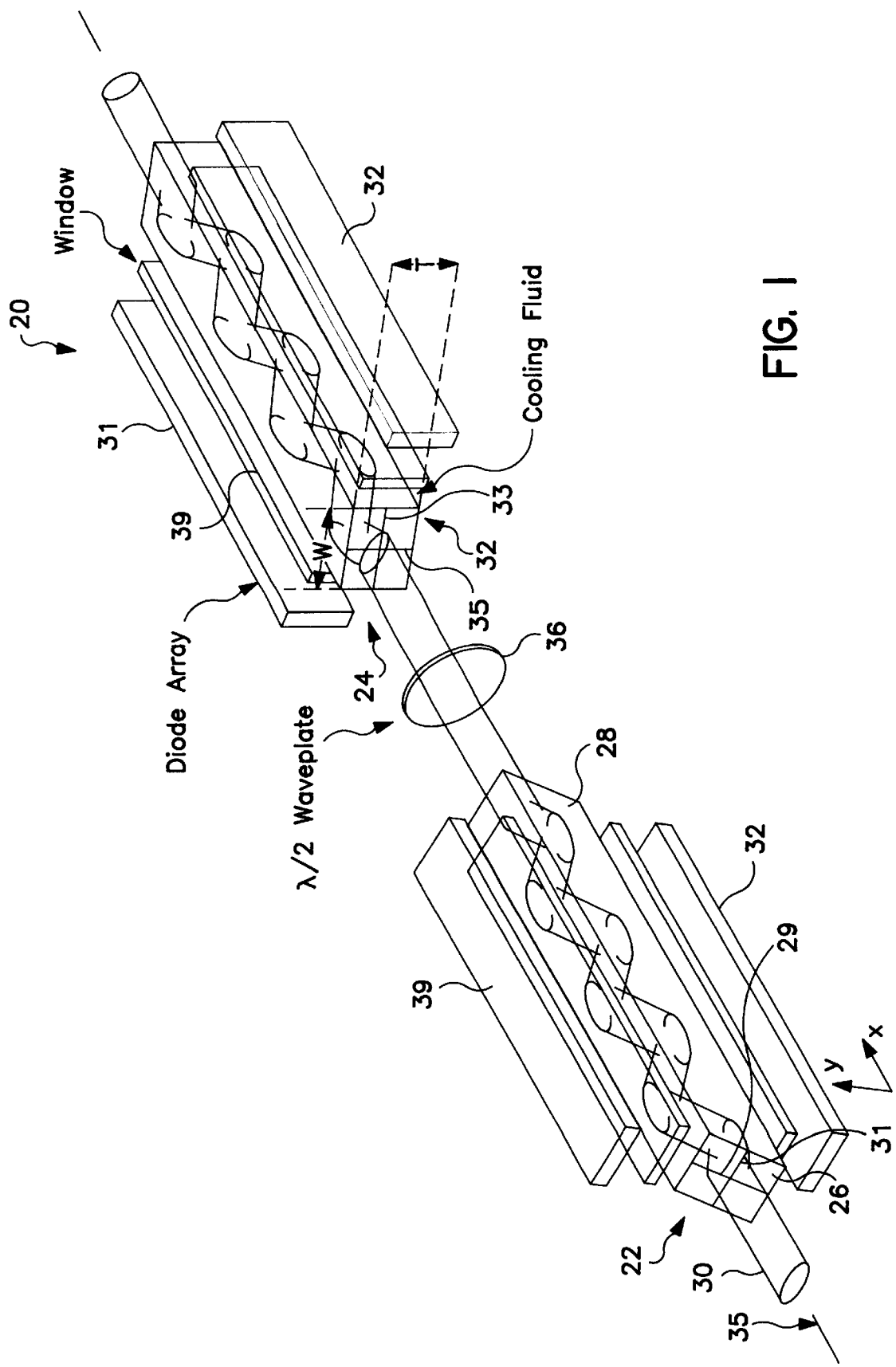
FIG. 1 is a block diagram of a first embodiment of the invention illustrating the slabs rotated generally orthogonal relative to one another.
Figure 2:
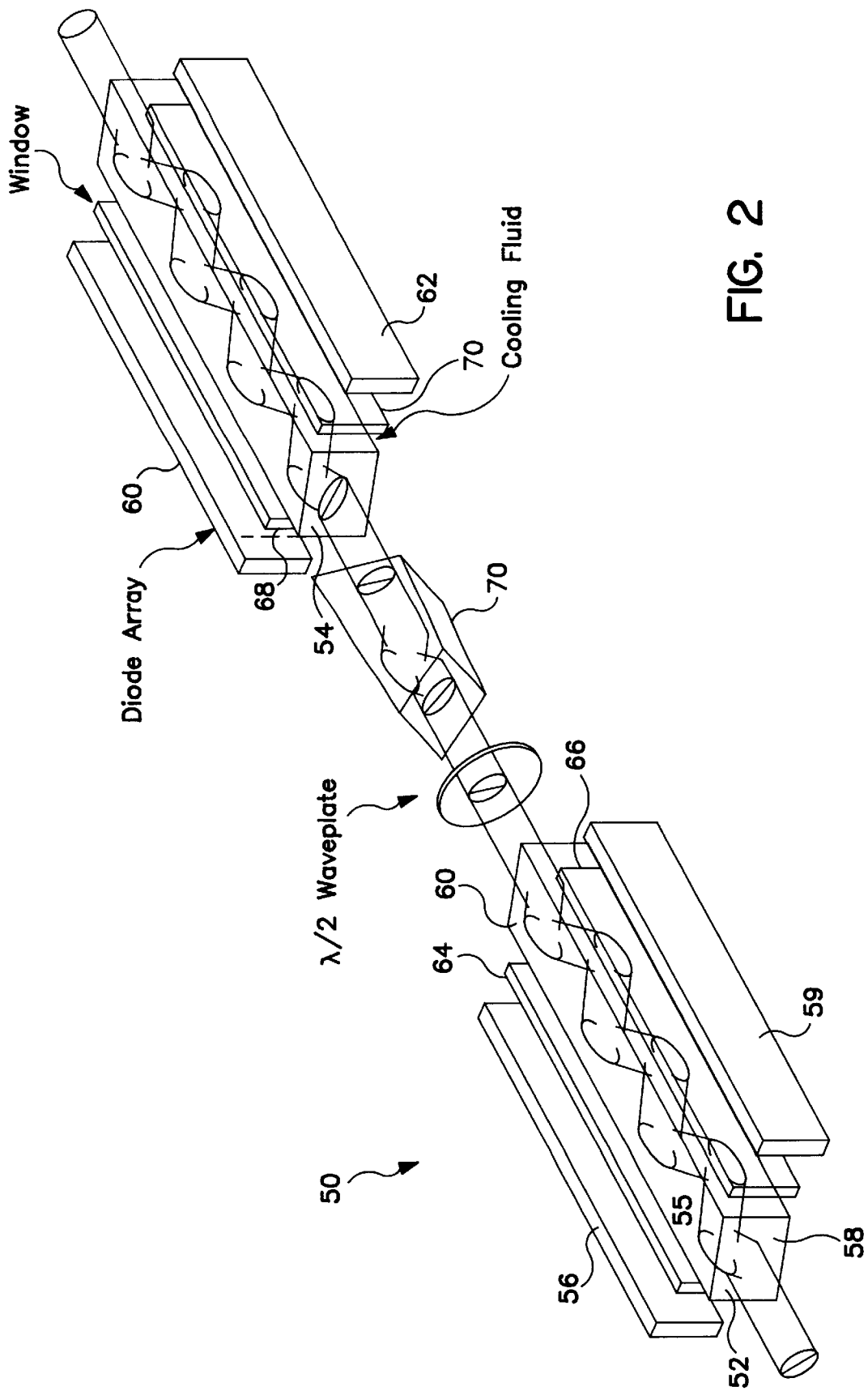
FIG. 2 is an alternate embodiment of the invention illustrating the use of a dove prism.
Figure 3:
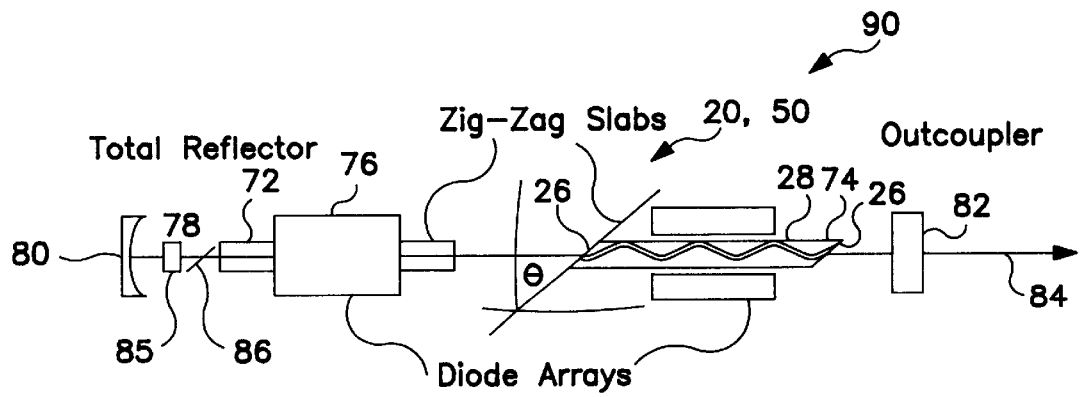
FIG. 3 is a block diagram of the present invention incorporated in a resonator configuration.

The present invention relates to an optical amplifier formed from a plurality of elongated slabs of a solid state lasing material for use in a solid state laser or master oscillator power amplifier (MOPA). In accordance with an important aspect of the invention, the configuration of the optical amplifier compensates for astigmatism in the output beam of the amplifier resulting from thermal gradients in a traverse or vertical direction in the slabs. Two embodiments of the optical amplifier are disclosed. Both embodiments include two slabs of a solid state lasing material. In one embodiment, illustrated in FIG. 1, two similar slabs, each having a generally square or rectangular cross-section defining a major axis and a minor axis, are configured such that the longitudinal axis of the slabs are coaxially aligned and rotated generally with respect to one another such that the major axes of the slabs are generally orthogonal to each other. FIG. 2 illustrates an alternate embodiment of the invention which also incorporates two similar slabs. In this embodiment of the invention, instead of rotating the slabs with respect to one another, a dove prism is used to rotate the beam. Both embodiments of the invention simplify compensation of the optical phase distortion (OPD) of the wavefront of the output beam resulting from thermal gradients in a transverse or vertical direction relative to the slab. Both embodiments of the optical amplifiers illustrated in FIGS. 1 and 2 are adapted to be incorporated into a resonator, forming a solid state laser as illustrated in FIG. 3 or a master oscillator power amplifier (MOPA). In all such embodiments, the optical phase distortion of the output wavefront is more easily compensated than known systems.

Referring to FIG. 1, an optical amplifier, generally identified with the reference numeral 20, is illustrated. The optical amplifier 20 includes two elongated slabs 22 and 24. Each slab 22 and 24 is formed from a solid state lasing material having a relatively high index of refraction. Various solid state lasing materials are suitable, such as a rare earth doped yttrium-aluminum-garnet (YAG) crystal, such as neodymium doped yttrium-aluminum-garnet (Nd:YAG), silicate or phosphate glass and virtually any other lasing material having a relatively high refractive index. In accordance with an important aspect of the invention, each of the elongated slabs 22, 24 is formed with a generally square or rectangular cross section having a near unity aspect ratio defining a major axis 29, 33 and a minor axis 31,35 as shown. As used herein the major axis 29,33 is along the zig-zag direction. The aspect ratio is herein defined as the ratio of the slab width W to the slab thickness T. Each slab 22, 24 includes a pair of opposing end faces 26 and four lateral surfaces 28 disposed between the opposing end faces 26. As shown best in FIGS. 3 and 4, the end faces 26 may be formed at a non-perpendicular angle θ (FIG. 3) relative to a vertical axis perpendicular to the longitudinal axis 29 of the slab. The angle θ is selected to be the complement of the Brewster angle relative to the slab surface, for example, around 30°. With this configuration, the angle of the incoming beam is generally parallel to the longitudinal axis of the slab. Thus, by properly selecting the angle θ, a light beam 30 (FIG. 1) entering the end faces 26 of slabs 22 and 24 will be totally internally reflected in a generally zig-zag pattern within the slab as shown. Alternatively, the angle may be selected around 50° relative to the normal to the surface and the light beam directed normally perpendicular to the angled surface. In this embodiment a suitable anti-reflectance coating may be used to reduce losses.

As mentioned above, external light sources are used to pump the atoms within the slabs 22, 24 to a relatively high energy metastable state. Various light sources are known to be used for pumping including diode arrays. Such diode arrays pumping sources are disclosed in U.S. Pat. Nos. 4,852,109; 4,949,346; 4,984,246; 5,271,031; 5,305,345; 5,317,585; 5,351,251 and commonly owned co-pending patent application Ser. No. 08/766,434, filed on Dec. 12, 1996, all hereby incorporated by reference.

As shown, in FIG. 1, diode arrays 31 and 32 are shown disposed along opposing lateral surfaces 28 of each of the slabs 22, 24. As mentioned above, excitation of the atoms within the slabs 22, 24 due to pumping results in a considerable amount of heat being generated within the slab. In order to reduce the heat within the slabs 22 and 24, cooling channels, for example, as disclosed in commonly owned U.S. Pat. No. 5,646,773, hereby incorporated by reference, may be utilized. The cooling channels 32 are formed adjacent opposing lateral surfaces 28 of each of the slabs 22 and 24. The cooling channels 32 may be formed by way of windows 34, for example, formed from a transparent material, such as fused silica, glass or sapphire material, disposed between the diode arrays 30 and 32 and the opposing lateral surfaces 28 of the slabs 22 and 24. A cooling fluid is then directed along the cooling channel, for example, as disclosed commonly owned in U.S. Pat. No. 5,646,773. The volumetric flow rate and temperature of fluid in the cooling channels can be adjusted to vary the surface temperature of the lateral surfaces 28.

Although the surface temperature of the lateral surfaces 28 can be adjusted by varying the volumetric flow rate and temperature of the coolant, thermal gradients still exist in the slabs 22, 24 resulting from the hotter inner portions of the slabs 22 and 24 and the cooler lateral surfaces 28. These thermal gradients are known to cause optical phase distortion of the wavefront of the output laser beam. More particularly, the thermal gradients within the slabs 22 and 24 cause a variation in the refractive index in the slab material resulting in a thermal lensing affect causing the slab to be astigmatic. In accordance with an important aspect of the invention the slabs 22 and 24 are disposed such that their respective longitudinal axes of the slabs 22, 24 are coaxially aligned and their respective major axes are relatively orthogonal to each other. As illustrated in FIG. 1, the slabs 22, 24 are configured such that the major axis 29 of the slab 22 is generally perpendicular to the major axis 33 of the slab 24. In this manner, the astigmatic affects of the single slab may be compensated.

The variation in the refractive index in a traverse direction (i.e. along the minor axis, generally perpendicular to the major axis 29, 33 of the slabs 22, 24) causes a thermal lensing affect. In particular, for each slab 22, 24 there is a positive lensing affect along the minor axis 31, 35 and a slight negative lensing affect along the major axis 29, 33. These positive and negative lensing affects results in optical phase distortion of the output wavefront. By rotating the two slabs 22, 24 so that the major axes 29, 33 are not parallel, for example, so that the major axes 29, 33 of the two slabs 22, 24 are generally orthogonal to each other as discussed above, the phase distortions become azimuthally symmetric and the negative lens affect along the major axis of one slab 22, 24 partially compensates for the positive lens affect along the minor axis of the other slab 22, 24 and vice versa, resulting in a more early correctable spherical lens.

A polarization rotation device, such as a half wave retardation plate or 90° quartz rotator 36 may be used and disposed between the two slabs 22, 24 as shown to rotate the beam polarization between the slabs 22 and 24. The half wave retardation plate 36 is important for Brewster angle slabs which have high losses if the beam entering the slab is not polarized in the plane of incidence (p-polarized). Normal incidence slabs do not suffer from loss due to polarization.

However, the half wave retardation plate 36 may be used if there is a requirement for a specific polarization relative to the zig-zag direction as in the case of birefringent host slab material, such as YLF; $YVO_4$ or $YAlO_3$.

An alternate embodiment of the invention is illustrated in FIG. 2. In this embodiment, the optical amplifier, generally identified with the reference numeral 50, includes a pair of slabs 52 and 54 as discussed above; each slab defining a major axis 55. The slabs 52 and 54 include opposing end faces 58 angled as discussed above and four lateral surfaces 60. Diode arrays 56, 59, 60 and 62 are disposed adjacent lateral surfaces 60 of each of the slabs 52 and 54 as discussed above. A plurality of windows 64, 66, 68 and 70 may be disposed generally parallel with the opposing lateral surfaces 60 of each of the slabs 52 and 54 to form cooling compartments for receiving cooling fluid as discussed above.

In the embodiment illustrated in FIG. 2, the longitudinal axis of the slabs 52, 54 are generally coaxially aligned. However, unlike the embodiment of FIG. 1, the slabs 52, 54 are oriented such that the respective major axes 55 of the slabs 52, 54 are generally parallel to each other. The embodiment illustrated in FIG. 2 is particularly suitable for applications when the slabs 52 and 54 cannot be practically rotated relative to one another. In such applications, a dove prism 68 may be used to rotate the beam between the slabs 52, 54. The dove prism 68 is positioned along a longitudinal axis between the two slabs 52 and 54 and rotated 45° relative to the major axes 55 of the slabs 52, 54. The dove prism 68 not only rotates the beam by 90° but also rotates the polarization by 90. The polarization relative to the lasing axis may be maintained with the use of a waveplate of quartz rotator as discussed above.

Figure 4:
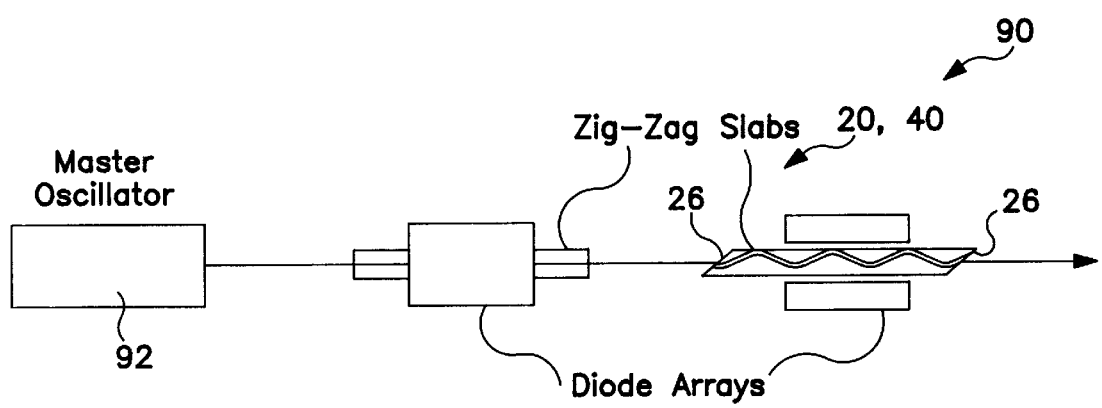
FIG. 4 is a block diagram of the present invention in a master oscillator power amplifier (MOPA) configuration.

The optical amplifiers 20 and 50 may be used in a resonator as illustrated in FIG. 3 or to amplify the output of a master oscillator to form a master oscillator power amplifier (MOPA) as illustrated in FIG. 4. Referring first to FIG. 3 a resonator 70 is illustrated. The resonator 70 includes an optical amplifier 20, 50 as discussed above, which includes a pair of diode arrays as discussed above. The windows and cooling channels are omitted for clarity. As shown, the slabs 72 and 74 are aligned along a longitudinal axis 78. A total reflector 80 is disposed along the longitudinal axis 78, adjacent to slab 72 while an outcoupler 82 is disposed along the longitudinal axis 78 adjacent an end face 26 of the other slab 74. The outcoupler 82 is a partially reflective mirror which allows partial transmission of an output beam 84. A Q switch 85 may be disposed between the total reflector 80 and the slab 72 for enabling the resonator 70 to generate pulses. A polarizer 86 may be disposed adjacent the Q switch 85.

In resonator applications which utilize the optical amplifier 20 as illustrated in FIG. 1, the orthogonal slabs provide an added advantage of stabilizing the oscillator. More particularly, the positive lens affect along the minor axis of the slab is normally stronger than the negative lens affect along the major axis. Oscillators are known to tolerate significant positive lensing but are known to become unstable with very small amounts of negative lensing. The rotated slabs allow the positive lens along the minor axis of one slab to compensate the negative lens affect along the minor axis from the other slab and vice versa, thus stabilizing the laser without the use of external lenses to compensate for the negative lens along the major axis.

FIG. 4 illustrates an application of the optical amplifiers 24, 40 used in a master oscillator power amplifier (MOPA) configuration. In this embodiment, the optical amplifiers 20, 40 are used to amplify the output signal from a master oscillator 92 to form a MOPA. The master oscillator may be for example as illustrated and described in connection with FIG. 3. As discussed in commonly owned U.S. Pat. No. 5,555,254, hereby incorporated by reference, such MOPAs typically include an image relaying telescope for beam transfer. An important aspect of the invention is that the rotated slabs allow azimuthally symmetrical lens which can be corrected with a simple two-lens image relay telescope used for beam transfer by simply varying the power of one of the lenses, whereas astigmatic aberrations normally require separate cylindrical lenses or complex anamorphic telescopes for correction.

For optical symmetry, the lensing in the slabs should be as close to one another as possible in order to eliminate astigmatism. The optical phase distortion in each slab may be adjusted by varying the flow rate or temperature across one slab relative to the other or by varying the diode array current in any one slab.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. An optical amplifier comprising:
   a first slab of a solid state lasing material having a generally rectangular cross-section, defining a first major axis and longitudinal axis, said first slab defining opposing end faces and four lateral surface;
   a second slab of a solid state lasing material having a generally rectangular cross-section defining a second major axis and a longitudinal axis, said second slab defining opposing end faces and four lateral surfaces said first and second axis configured such that their respective longitudinal axes are generally coaxially aligned, said first and second slabs configured to reflect light entering one of the end faces in a zig zag pattern;
   first and second pumping sources applied to two opposing lateral surfaces of said first and second slabs;
   first and second cooling means applied to said two opposing lateral surfaces of said first and second slabs; and
   a polarization rotation device disposed between said first and second stabs.

2. The optical amplifier as recited in claim 1, wherein said first and second slabs are configured such that their respective major axes are not parallel.

3. The optical amplifier as recited in claim 2, wherein said first and second slabs are configured such that their respective major axis are generally perpendicular.

4. The optical amplifier as recited in claim 1, wherein said first pumping source includes one or more diode arrays.

5. The optical amplifier as recited in claim 1, wherein said second pumping source includes one or more diode arrays.

6. The optical amplifier as recited in claim 1, wherein said first and second pumping sources are configured to pump light along one or more of said lateral faces of said first and second slabs.

7. The optical amplifier as recited in claim 1, wherein said first and second cooling means includes cooling channels disposed adjacent one or more of said lateral faces of each of said first and second slabs.

8. The optical amplifier as recited in claim 7, wherein each channel is formed by a window disposed generally parallel along a lateral face.

9. The optical amplifier as recited in claim 1, further including a dove prism disposed between said first and second slabs and wherein said first and second axis are generally parallel with respect to one another.

10. The optical amplifier as recited in claim 1, wherein said first and second slabs are formed from the same type of solid state lasing material.

11. The optical amplifier as recited in claim 10, wherein said solid state lasing material is a rare-earth doped YAG.

12. The optical amplifier as recited in claim 11, wherein said first and second pumping sources are configured to pump light along one or more of said lateral faces of said first and second slabs.

13. The optical amplifier as recited in claim 12, wherein said first pumping source includes one or more diode arrays.

14. The optical amplifier as recited in claim 13, wherein said second pumping source includes one or more diode arrays.

15. A master oscillator comprising:
   a total reflector;
   a Q switch;
   an optical amplifier, said optical amplifier comprising:
      a first slab of a solid state lasing material having a generally rectangular cross-section defining a first major axis and longitudinal axis, said first slab defining opposing end faces and four lateral surfaces; and
      a second slab of a solid state lasing material having a generally rectangular cross-section defining a second major axis and a longitudinal axis, said second slab defining opposing end faces and four lateral surfaces; said first and second axis configured such that their respective longitudinal axes are generally coaxially aligned;
   first and second pumping sources for said first and second slabs; first and second cooling means for said first and second slabs; and
   an outcoupler.

16. The master oscillator as recited in claim 15, wherein said respective major axes of said first and second slabs are configured to be nonparallel to one another.

17. The master oscillator as recited in claim 16, wherein said first and second slabs are configured such that there respective major axes are generally perpendicular with respect to one another.

18. The master oscillator as recited in claim 16, wherein said first and second slabs are configured such that there respective major axes are generally parallel with respect to one another.

19. A master oscillator power amplifier (MOPA) comprising:
   a master oscillator;
   an optical amplifier, said optical amplifier comprising:
      a first slab of a solid state lasing material having a generally rectangular cross-section defining a first major axis and longitudinal axis, said first slab defining opposing end faces and four lateral surfaces; and
      a second slab of a solid state lasing material having a generally rectangular cross-section defining a second major axis and a longitudinal axis, said second slab defining opposing end faces and four lateral surfaces; said first and second axis configured such that their respective longitudinal axes are generally coaxially aligned;
   first and second pumping sources for said first and second slabs; and
   first and second cooling means for said first and second slabs.

20. The MOPA as recited in claim 19, wherein said respective major axes of said first and second slabs are configured to be non-parallel to one another.

21. The MOPA as recited in claim 20, wherein said first and second slabs are configured such that there respective major axes are generally perpendicular with respect to one another.

22. The MOPA as recited in claim 19, wherein said first and second slabs are configured such that there respective major axes are generally parallel with respect to one another.

23. The MOPA recited in claim 19, wherein said master oscillator includes an optical amplifier, a total reflector and an outcoupler.

24. The MOPA as recited in claim 23 wherein said optical amplifier comprises:
   a first slab of a solid state lasing material having a generally rectangular cross-section defining a first major axis and longitudinal axis, said first slab defining opposing end faces and four lateral surfaces; and
   a second slab of a solid state lasing material having a generally rectangular cross-section defining a second major axis and a longitudinal axis, said second slab defining opposing end faces and four lateral surfaces; said first and second axis configured such that their respective longitudinal axes are generally coaxially aligned;
   first and second pumping sources for said first and second slabs; and
   first and second cooling means for said first and second slabs.

25. The MOPA as recited in claim 19, wherein said respective major axes of said first and second slabs are configured to be non-parallel to one another.

26. The master oscillator as recited in claim 20, wherein said first and second slabs are configured such that there respective major axes are generally perpendicular with respect to one another.

27. The master oscillator as recited in claim 19, wherein said first and second slabs are configured such that there respective major axes are generally parallel with respect to one another.

28. A master oscillator comprising:
   a total reflector;
   an optical amplifier, said optical amplifier comprising:
      a first slab of a solid state lasing material having a generally rectangular cross-section defining a first major axis and longitudinal axis, said first slab defining opposing end faces and four lateral surfaces; said first and second axis configured such that their respective longitudinal axes are generally coaxially aligned, said first and second slabs configured such that light applied to one of said opposing end faces is reflected through said first and second slabs in a generally zig zag pattern;
   first and second pumping sources applied to two opposing lateral surfaces of said first and second slabs;

first and second cooling means applied to said two opposing lateral surfaces of said first and second slabs; and an outcoupler.

29. The master oscillator as recited in claim 27, wherein said respective major axes of said first and second slabs are configured to be non-parallel to one another.

30. The master oscillator as recited in claim 29, wherein said first and second slabs are configured such that their respective major axes are generally perpendicular with respect to one another.

31. The master oscillator as recited in claim 29, wherein said first and second slabs are configured such that their respective major axes are generally parallel with respect to one another.

* * * * *